J. F. MUSSELMAN.
CHUCK.
APPLICATION FILED MAY 7, 1912. RENEWED JUNE 14, 1915.
1,168,540.
Patented Jan. 18, 1916.
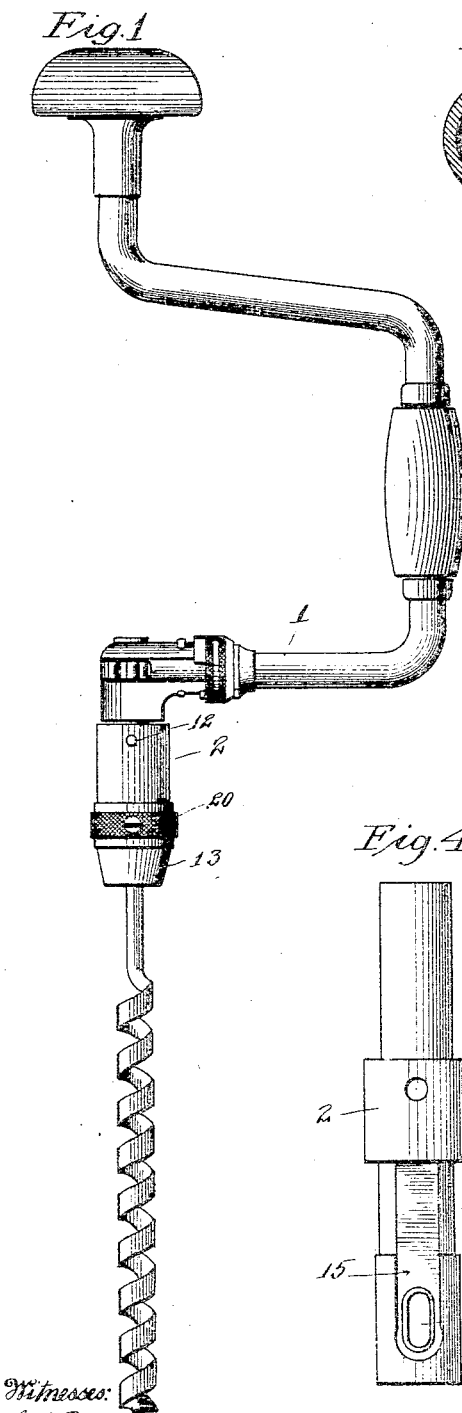
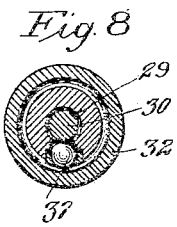
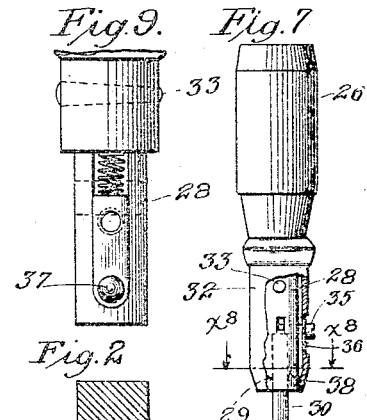
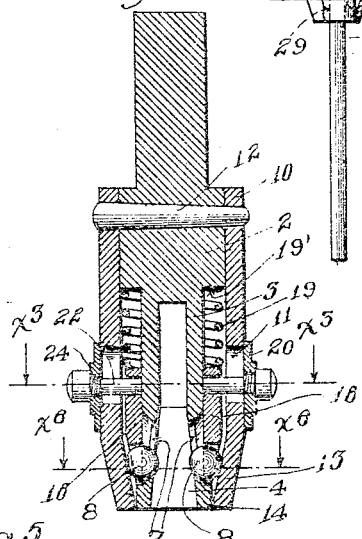
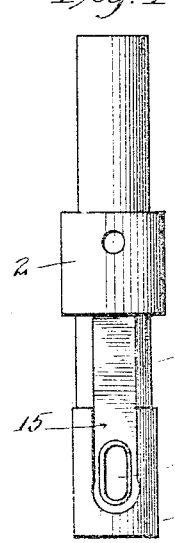
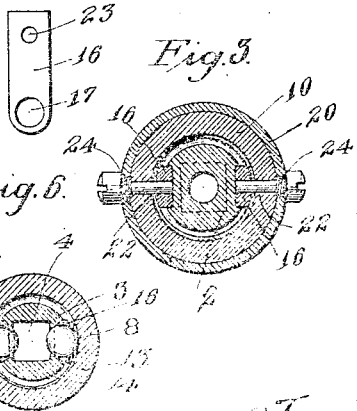
Inventor
John F. Musselman

UNITED STATES PATENT OFFICE.

JOHN F. MUSSELMAN, OF LOS ANGELES, CALIFORNIA.

CHUCK.

1,168,540.  Specification of Letters Patent.  Patented Jan. 18, 1916.

Application filed May 7, 1912, Serial No. 695,771. Renewed June 14, 1915. Serial No. 34,072.

*To all whom it may concern:*

Be it known that I, JOHN F. MUSSELMAN, a citizen of the United States, residing at Los Angeles, in the county of Los Angeles and State of California, have invented a new and useful Chuck, of which the following is a specification.

This invention relates to chucks for fastening bits or other tools in braces, handles, or other tool holders, or generally, for fastening any object in a holder therefor, and the main object of the present invention is to provide a device for this purpose which will enable insertion and fastening of the object in the holder to be performed quickly, easily and effectively.

A further object of the invention is to provide a chuck in which the object to be fastened may be secured in the chuck by simply sliding or pushing it into the chuck.

Another object of the invention is to provide for quick and convenient release of the chuck from the tool or other object.

Other objects of the invention will appear hereinafter.

The accompanying drawings illustrate an embodiment of the invention, and referring thereto:

Figure 1 is a side elevation of a brace provided with my improved chuck. Fig. 2 is a vertical section of the chuck. Fig. 3 is a section on line $x^3$—$x^3$, Fig. 2. Fig. 4 is a side elevation of the interior body of the chuck. Fig. 5 is a side elevation of a slide for gripping balls used in the chuck. Fig. 6 is a section on line $x^6$—$x^6$ in Fig. 2. Fig. 7 is a side elevation of a tool set handle provided with my invention. Fig. 8 is a transverse section on line $x^8$—$x^8$, Fig. 7. Fig. 9 is a front elevation with outer casing removed.

The chuck is shown in Fig. 1 as used in connection with a brace, but it will be understood that it can be used in connection with any other tool holder or support.

1 designates a tool holder support or device to which the tool is to be secured, and 2 designates a chuck body provided with a shank secured in said support and provided with a socket 3 for receiving the shank of the tool. The outer portion of said socket may be formed with a flaring rectangular recess as shown at 4 to conform to the shape of the shank of a bit, or it may be otherwise formed to conform to the shape of the shank of any tool to be fastened in the socket. The socket is slotted as indicated at 7, there being, for example, a slot 7 at each side of the socket for receiving a ball 8. The outer tubular member or sleeve 10 extends around the body 2 and is secured thereto, for example, by a wedge-pin 12, said sleeve 10 extending around the socket portion of the chuck and having a tapered end portion 13 which may fit an enlarged portion 14 at the end of the socket portion of the chuck, this tapered portion 13 serving as an incline or cone for forcing the balls 8 inwardly in the chucking operation, the slot 7 being dovetailed so as to be somewhat narrower at its inner edge than the diameter of the ball, so that the ball is prevented from going clear through the slot, but is allowed to project slightly from the slot into the recess in the socket. The socket portion of the chuck is provided on its outer wall with two longitudinal grooves 15 for receiving slides 16, each slide 16 having a recess or perforation 17 for receiving and engaging the ball 8. The upper ends of said slides are engaged by a spring 19 whose upper end engages a shoulder 19' on the chuck body 2, said spring serving to push said slides downward, so as to force the balls 8 against the incline or taper portion 13 of the outer member 10 and thereby cause the balls to be forced inwardly. For releasing the gripping or clutch balls 8, means are provided for temporarily withdrawing said slides 16, said means consisting of a ring 20 surrounding the outer member 10 and pins 22 secured in said ring and engaging in perforations 23 in slides, the outer member 10 being slotted as at 11 for passage of said pins. Each pin 22 may have a screw portion 24 screwing into the ring to hold the pin in place, but to enable removal of the pin when required.

The operation is as follows: The tool is inserted in the socket by pushing the shank or stock of the tool into the socket and is then gripped by engagement of the balls or clutch devices 8 with the sides of said shank or stock, the latter fitting into the socket so as to prevent lateral movement and the balls preventing longitudinal movement. When it is desired to remove the tool, the ring 20 is pushed so as to move the balls away from the tool stock which is thereby released.

When the device is used in connection with a tool holder such as a brace provided with a flaring socket for the tool stock or shank, it is advantageous to provide two balls at opposite sides as shown in Figs. 2 and 6, so that in the outward movement of the tool, the balls follow the same simultaneously and prevent release of the tool by withdrawal of the same from the diverging walls.

In case the invention is applied in connection with a tool holder for tools having a straight shank or stock, it is only necessary to provide a clutch ball or device at one side. Such a construction is shown in Figs. 7 and 8, wherein 26 designates a handle provided with a metallic socket member 28 having a cylindrical socket or recess 29 for receiving the cylindrical stock or shank 30 of a tool. An outer member 32 extends around said socket member and is secured to the handle 26 by a pin 33. Said outer member is slotted at one side for passage of a handle member 35 which is screwed to a slide member 36 for controlling the position of the clutch ball 37, said clutch ball engaging with the side of the tool shank 30 and with an incline portion 38 on the outer member 32 to grip the tool shank when the same is pulled outwardly, but to allow the tool shank to be pushed inwardly. The operation of this form of the invention is similar to that above described, the tool being inserted by simply pushing it into the socket and being then gripped by the clutching device 37 and the tool being released by pushing up the handle member 35 so as to move the clutch device away from the outer end of the tool holder.

What I claim is:

1. A chuck comprising a body having a tool socket the wall of which is provided with a longitudinal slot and a straight longitudinal outer surface surrounding said slot; an outer shell secured to inclose the socketed part of said body, and provided internally with an inwardly inclined part opposite the slot of said body; a gripping member mounted to move longitudinally in said slot; and means engaging and guided by said straight longitudinal surface, and operable from the exterior of the shell for positively moving the gripping member longitudinally within the slot.

2. A chuck comprising a main body having a socket non-circular in cross section adapted to receive and positively rotate the shank of a tool, said socketed member having a longitudinally extending slot opening into the tool engaging wall of the socket, and a straight longitudinal outer surface; an outer sleeve inclosing said main body and provided internally with an inwardly tapered or inclined wall; a gripping member mounted to move in said slot; a slide interposed between the outer sleeve and socketed part of the main body; means engaging and guided by said straight surface and positively engaging said gripping member to move the latter in its slot; a coiled spring surrounding the socketed portion of the main body and operatively engaging the slide; an outer ring movably mounted upon the sleeve; and operative connections between said ring and slide.

In testimony whereof, I have hereunto set my hand at Los Angeles, California, this 29th day of April, 1912.

JOHN F. MUSSELMAN.

In presence of—
ARTHUR P. KNIGHT,
MARTHA M. LANGE.